US012785413B2

(12) United States Patent
Reis et al.

(10) Patent No.: US 12,785,413 B2
(45) Date of Patent: Nov. 3, 2026

(54) SYSTEMS AND METHODS FOR CAPACITOR DISCHARGE CONTROL IN FORWARD AND REVERSE CHARGING

(71) Applicant: BorgWarner US Technologies LLC, Wilmington, DE (US)

(72) Inventors: Alexandre M. S. Reis, Westfield, IN (US); Abhishek Vijay Danekar, Kokomo, IN (US); Sunil Sreedhar, Westfield, IN (US)

(73) Assignee: BorgWarner US Technologies LLC, Wilmington, DE (US)

( * ) Notice: Subject to any disclaimer, the term of this patent is extended or adjusted under 35 U.S.C. 154(b) by 812 days.

(21) Appl. No.: 18/323,497

(22) Filed: May 25, 2023

(65) Prior Publication Data

US 2024/0396360 A1 Nov. 28, 2024

(51) Int. Cl.
*H02J 7/04* (2006.01)
*H02J 105/37* (2026.01)
(Continued)

(52) U.S. Cl.
CPC ........... *H02J 7/04* (2013.01); *H02M 3/33584* (2013.01); *H02M 7/217* (2013.01); *H02J 2105/37* (2026.01)

(58) Field of Classification Search
CPC ...... H02J 7/04; H02J 2105/37; H02J 2207/20; H02J 3/32; H02J 3/322; H02M 3/33584;
(Continued)

(56) References Cited

U.S. PATENT DOCUMENTS 7,388,353 B2 * 6/2008 Kato .................. H02M 5/4585 363/121
7,929,323 B2 * 4/2011 Schmidt ................ H02M 7/062 363/125
(Continued)

FOREIGN PATENT DOCUMENTS

CN 112224050 A 1/2021
EP 3050741 B1 4/2017
(Continued)

OTHER PUBLICATIONS

Sithara S G Acharige et al: "Review of Electric Vehicle Charging Technologies, Configurations, and Architectures", arxiv.org, Cornell University Library, 201 Olin Library Cornell University Ithaca, NY 14853, Sep. 30, 2022 (Sep. 30, 2022), XP091331035.
(Continued)

*Primary Examiner* — Jared Fureman
(74) *Attorney, Agent, or Firm* — Joshua M. Haines; Bookoff McAndrews, PLLC

(57) ABSTRACT

A system includes: an alternating current (AC) to direct current (DC) converter (AC-DC converter) including: a bulk capacitor, and an AC-DC converter switch connectable to a line voltage; a DC to DC converter (DC-DC converter) connected to the AC-DC converter, the DC-DC converter including: one or more transformers having a secondary side connectable to a battery, and a bridge driver connected to a primary side of the one or more transformers, the bridge driver including a bridge driver switch; and one or more controllers configured to control an operation of the bridge driver switch to control a discharge of the bulk capacitor to the battery at an end of a grid-to-battery operation, the grid-to-battery operation to supply electric power from the line voltage to the battery.

18 Claims, 8 Drawing Sheets

(51) Int. Cl.
*H02M 3/335* (2006.01)
*H02M 7/217* (2006.01)

(58) Field of Classification Search
CPC ....... H02M 7/217; H02M 1/322; Y02T 10/70; B60L 53/20; B60L 53/22; B60L 53/24; B60L 55/00
See application file for complete search history.

(56) References Cited

U.S. PATENT DOCUMENTS

| | | | | |
|---|---|---|---|---|
| 8,773,065 | B2 * | 7/2014 | Ang | B60L 53/14 320/140 |
| 8,810,061 | B2 * | 8/2014 | Sugiyama | B60L 53/14 307/9.1 |
| 9,457,683 | B2 * | 10/2016 | Bruyere | B60L 58/10 |
| 10,090,775 | B2 * | 10/2018 | Halberstadt | H02M 7/06 |
| 10,432,097 | B2 * | 10/2019 | Lind | H02M 1/143 |
| 10,804,715 | B2 * | 10/2020 | Yamada | B60L 50/51 |
| 10,862,148 | B2 * | 12/2020 | Yoshida | B60L 1/00 |
| 12,476,551 | B2 * | 11/2025 | Sohma | H02M 1/0058 |
| 2005/0231171 | A1 * | 10/2005 | Kato | H02M 5/4585 320/166 |
| 2010/0080022 | A1 * | 4/2010 | Schmidt | H02M 7/062 363/53 |
| 2013/0193751 | A1 * | 8/2013 | Sugiyama | B60L 53/14 307/9.1 |
| 2013/0221921 | A1 * | 8/2013 | Ang | B60L 1/003 320/109 |
| 2016/0236580 | A1 | 8/2016 | Hou et al. | |
| 2017/0031410 | A1 * | 2/2017 | Muccini | G06F 1/263 |
| 2017/0080808 | A1 * | 3/2017 | Bai | B60L 53/00 |
| 2017/0366093 | A1 | 12/2017 | Wambsganss | |
| 2018/0109193 | A1 | 4/2018 | Hirota et al. | |
| 2019/0252995 | A1 * | 8/2019 | Dai | H02M 7/06 |
| 2020/0298722 | A1 | 9/2020 | Smolenaers | |
| 2024/0092177 | A1 * | 3/2024 | Gerard | H01M 16/006 |

FOREIGN PATENT DOCUMENTS

| | | | | | |
|---|---|---|---|---|---|
| JP | 2020127299 | A | * | 8/2020 | |
| JP | 2023069257 | A | | 5/2023 | |
| WO | WO-2017009978 | A1 | * | 1/2017 | B60L 58/16 |

OTHER PUBLICATIONS

Zhang Zhengda et al: "Investigation of Adaptive Synchronous Rectifier (SR) Driving Scheme for LLC/CLLC Resonant Converter in EV On-Board Chargers", 2020 IEEE Applied Power Electronics Conference and Exposition (APEC), IEEE, Mar. 15, 2020 (Mar. 15, 2020), pp. 2185-2191, XP033784763.

* cited by examiner

SYSTEMS AND METHODS FOR CAPACITOR DISCHARGE CONTROL IN FORWARD AND REVERSE CHARGING

TECHNICAL FIELD

Various embodiments of the present disclosure relate generally to systems and methods for capacitor discharge and, more particularly, to systems and methods for capacitor discharge and energy storage in a bidirectional on-board charger.

BACKGROUND

An on-board charger may be a bi-directional system that converts AC voltage to DC voltage in a charging mode (grid-to-battery) and DC voltage to AC voltage in a discharge or inverter mode (battery-to-grid). To satisfy HV safety requirements of a bi-directional on-board charger for automotive applications, in case of loss of communication or critical faults in a vehicle, components in the on-board charger should be discharged below a HV safety value. Some systems may not meet increased efficiency requirements and/or higher power density of an on-board charger.

The present disclosure is directed to overcoming one or more of these above-referenced challenges.

SUMMARY OF THE DISCLOSURE

In some aspects, the techniques described herein relate to a system including: an alternating current (AC) to direct current (DC) converter (AC-DC converter) including: a bulk capacitor, and an AC-DC converter switch connectable to a line voltage; a DC to DC converter (DC-DC converter) connected to the AC-DC converter, the DC-DC converter including: one or more transformers having a secondary side connectable to a battery, and a bridge driver connected to a primary side of the one or more transformers, the bridge driver including a bridge driver switch; and one or more controllers configured to control an operation of the bridge driver switch to control a discharge of the bulk capacitor to the battery at an end of a grid-to-battery operation, the grid-to-battery operation to supply electric power from the line voltage to the battery.

In some aspects, the techniques described herein relate to a system, wherein the one or more controllers are further configured to control an operation of: the bridge driver switch to control a discharge of the bulk capacitor to the battery in one or more of the grid-to-battery operation or a battery-to-grid operation, the battery-to-grid operation to supply electric power from the battery to a load of the line voltage, and the AC-DC converter switch to control the discharge of the bulk capacitor to the load of the line voltage in the battery-to-grid operation.

In some aspects, the techniques described herein relate to a system, wherein the one or more controllers are further configured to control the discharge of the bulk capacitor to the battery at the end of a grid-to-battery operation based on: the battery being connected to the DC-DC converter, and no hardware-related faults in the AC-DC converter or the DC-DC converter.

In some aspects, the techniques described herein relate to a system, wherein the one or more controllers are further configured to control the discharge of the bulk capacitor to the battery while a voltage of the bulk capacitor is above a peak voltage of the line voltage plus a hysteresis factor, when the line voltage is connected to the AC-DC converter.

In some aspects, the techniques described herein relate to a system, wherein the one or more controllers are further configured to control the discharge of the bulk capacitor to the battery while a voltage of the bulk capacitor is above a threshold, when the line voltage is disconnected from the AC-DC converter.

In some aspects, the techniques described herein relate to a system, wherein the threshold is 60V.

In some aspects, the techniques described herein relate to a system, wherein the one or more controllers are further configured to control the discharge of the bulk capacitor to the battery based on a current threshold.

In some aspects, the techniques described herein relate to a system, wherein the one or more controllers are further configured to modify the current threshold based on a change in a connection to one or more of the line voltage or the battery.

In some aspects, the techniques described herein relate to a system, wherein the line voltage is a three phase line voltage.

In some aspects, the techniques described herein relate to a system, wherein the DC-DC converter further includes: a bridge rectifier connected to a secondary side of the one or more transformers, the bridge rectifier including a bridge rectifier switch.

In some aspects, the techniques described herein relate to a system, wherein the one or more controllers are configured to control an operation of the bridge driver switch to control a discharge of the bulk capacitor without using a discharge resistor in the AC-DC converter or the DC-DC converter.

In some aspects, the techniques described herein relate to a system, further including: the battery connected to the DC-DC converter, wherein the system is provided as a bidirectional battery charger configured to: receive input AC power from the line voltage through the AC-DC converter, convert the AC power to DC power, and supply the DC power to the battery to charge the battery in the grid-to-battery operation, and receive DC power from the battery through the DC-DC converter, convert the DC power to AC power, and supply the AC power to the load of the line voltage as output AC power in the battery-to-grid operation.

In some aspects, the techniques described herein relate to a system, further including: an electric vehicle including the battery connected to the DC-DC converter.

In some aspects, the techniques described herein relate to a system, further including: an electric vehicle including the battery connected to the DC-DC converter, wherein the battery-to-grid operation is operable to supply electric power from the battery to an AC outlet of the electric vehicle as the load of the line voltage.

In some aspects, the techniques described herein relate to a method for controlling a system including an alternating current (AC) to direct current (DC) converter including: a bulk capacitor, and an AC to DC converter switch connectable to a line voltage; and a DC to DC converter connected to the AC to DC converter, the DC to DC converter including: one or more transformers having a secondary side connectable to a battery, and a bridge driver connected to a primary side of the one or more transformers, the bridge driver including a bridge driver switch, the method including: performing, by one or more controllers, operations including: controlling an operation of the bridge driver switch to control a discharge of the bulk capacitor to the battery at an end of a grid-to-battery operation, the grid-to-battery operation to supply electric power from the line voltage to the battery.

In some aspects, the techniques described herein relate to a method, wherein the operations further include: controlling an operation of the bridge driver switch to control a discharge of the bulk capacitor to the battery in one or more of the grid-to-battery operation or a battery-to-grid operation, the battery-to-grid operation to supply electric power from the battery to a load of the line voltage, and controlling an operation of the AC to DC converter switch to control the discharge of the bulk capacitor to a load of the line voltage in the battery-to-grid operation.

In some aspects, the techniques described herein relate to a method, wherein the operations further include: controlling the discharge of the bulk capacitor to the battery at the end of a grid-to-battery operation based on: the battery being connected to the DC to DC converter, and no hardware-related faults in the AC to DC converter or the DC to DC converter.

In some aspects, the techniques described herein relate to a method, wherein the operations further include: controlling the discharge of the bulk capacitor to the battery while a voltage of the bulk capacitor is above a peak voltage of the line voltage plus a hysteresis factor, when the line voltage is connected to the AC to DC converter, and controlling the discharge of the bulk capacitor to the battery while the voltage of the bulk capacitor is above a threshold, when the line voltage is disconnected from the AC to DC converter.

In some aspects, the techniques described herein relate to a method, wherein the operations further include: controlling the discharge of the bulk capacitor to the battery based on a current threshold, and modifying the current threshold based on a change in a connection to one or more of the line voltage or the battery.

In some aspects, the techniques described herein relate to a system including: one or more controllers configured to control an operation of a bridge driver switch to control a discharge of a bulk capacitor to a battery at an end of a grid-to-battery operation, the grid-to-battery operation to supply electric power from a line voltage to the battery.

In some aspects, the techniques described herein relate to a system including: an alternating current (AC) to direct current (DC) converter (AC-DC converter) including a bulk capacitor, the AC-DC converter connectable to a line voltage; a DC to DC converter (DC-DC converter) connected to the AC-DC converter, the DC-DC converter including: one or more transformers having a secondary side connectable to a battery, a bridge rectifier connected to the secondary side of the one or more transformers, the bridge rectifier including a bridge rectifier switch, and a filter capacitor; and one or more controllers configured to control an operation of the bridge rectifier switch to control a discharge of the filter capacitor to the bulk capacitor.

In some aspects, the techniques described herein relate to a system, wherein the one or more controllers are further configured to control the operation of the bridge rectifier switch to control the discharge of the filter capacitor to the bulk capacitor in each of a grid-to-battery operation and a battery-to-grid operation, the grid-to-battery operation to supply electric power from the line voltage to the battery and the battery-to-grid operation to supply electric power from the battery to a load of the line voltage.

In some aspects, the techniques described herein relate to a system, wherein the one or more controllers are further configured to: determine whether the battery is connected to the DC-DC converter, and control the operation of the bridge rectifier switch to control the discharge of the filter capacitor to the bulk capacitor, when the battery is determined to be disconnected from the DC-DC converter.

In some aspects, the techniques described herein relate to a system, wherein the one or more controllers are further configured to: set a battery disconnect fault and end one or more of the grid-to-battery operation or the battery-to-grid operation, when the battery is determined to be disconnected from the DC-DC converter.

In some aspects, the techniques described herein relate to a system, wherein the one or more controllers are further configured to: determine a current threshold, and control the operation of the bridge rectifier switch to control the discharge of the filter capacitor to the bulk capacitor, when the one or more of the grid-to-battery operation or the battery-to-grid operation has ended.

In some aspects, the techniques described herein relate to a system, wherein the filter capacitor is configured to filter a high frequency ripple from electric power supplied to the battery.

In some aspects, the techniques described herein relate to a system, wherein the one or more controllers are further configured to control the discharge of the filter capacitor to the bulk capacitor while a voltage of the filter capacitor is above a threshold.

In some aspects, the techniques described herein relate to a system, wherein the threshold is 60V.

In some aspects, the techniques described herein relate to a system, wherein the one or more controllers are configured to control the discharge of the filter capacitor to the bulk capacitor to transfer electrical energy from terminals that are exposed when the battery is disconnected from the DC-DC converter to the bulk capacitor, wherein the bulk capacitor is less exposed to external sources than the filter capacitor.

In some aspects, the techniques described herein relate to a system, wherein the discharge of the filter capacitor to the bulk capacitor decreases a voltage of the filter capacitor more than an increase in voltage of the bulk capacitor.

In some aspects, the techniques described herein relate to a system, wherein the one or more controllers are further configured to control a discharge of the bulk capacitor after controlling the discharge of the filter capacitor to the bulk capacitor.

In some aspects, the techniques described herein relate to a system, further including: the battery connected to the DC-DC converter, wherein the system is provided as a bidirectional battery charger configured to: receive input AC power from the line voltage through the AC-DC converter, convert the AC power to DC power, and supply the DC power to the battery to charge the battery in the grid-to-battery operation, and receive DC power from the battery through the DC-DC converter, convert the DC power to AC power, and supply the AC power to the load of the line voltage as output AC power in the battery-to-grid operation.

In some aspects, the techniques described herein relate to a system, further including: an electric vehicle including the battery connected to the DC-DC converter.

In some aspects, the techniques described herein relate to a system, further including: an electric vehicle including the battery connected to the DC-DC converter, wherein the battery-to-grid operation is operable to supply electric power from the battery to an AC outlet of the electric vehicle as the load of the line voltage.

In some aspects, the techniques described herein relate to a method for controlling a system including an alternating current (AC) to direct current (DC) converter including a bulk capacitor, the AC to DC converter connectable to a line voltage; and a DC to DC converter connected to the AC to DC converter, the DC to DC converter including: one or more transformers having a secondary side connectable to a battery, a bridge rectifier connected to the secondary side of the one or more transformers, the bridge rectifier including a bridge rectifier switch, and a filter capacitor, the method including: performing, by one or more controllers, operations including: controlling an operation of the bridge rectifier switch to control a discharge of the filter capacitor to the bulk capacitor.

In some aspects, the techniques described herein relate to a method, wherein the operations further include: controlling the operation of the bridge rectifier switch to control the discharge of the filter capacitor to the bulk capacitor in each of a grid-to-battery operation and a battery-to-grid operation, the grid-to-battery operation to supply electric power from the line voltage to the battery and the battery-to-grid operation to supply electric power from the battery to a load of the line voltage.

In some aspects, the techniques described herein relate to a method, wherein the operations further include: determining whether the battery is connected to the DC to DC converter, and controlling the operation of the bridge rectifier switch to control the discharge of the filter capacitor to the bulk capacitor, when the battery is determined to be disconnected from the DC to DC converter.

In some aspects, the techniques described herein relate to a method, wherein the operations further include: setting a battery disconnect fault and ending one or more of the grid-to-battery operation or the battery-to-grid operation, when the battery is determined to be disconnected from the DC to DC converter.

In some aspects, the techniques described herein relate to a method, wherein the operations further include: determining a current threshold, and controlling the operation of the bridge rectifier switch to control the discharge of the filter capacitor to the bulk capacitor, when the one or more of the grid-to-battery operation or the battery-to-grid operation has ended.

In some aspects, the techniques described herein relate to a system including: one or more controllers configured to control an operation of a bridge rectifier switch to control a discharge of a filter capacitor to a bulk capacitor.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
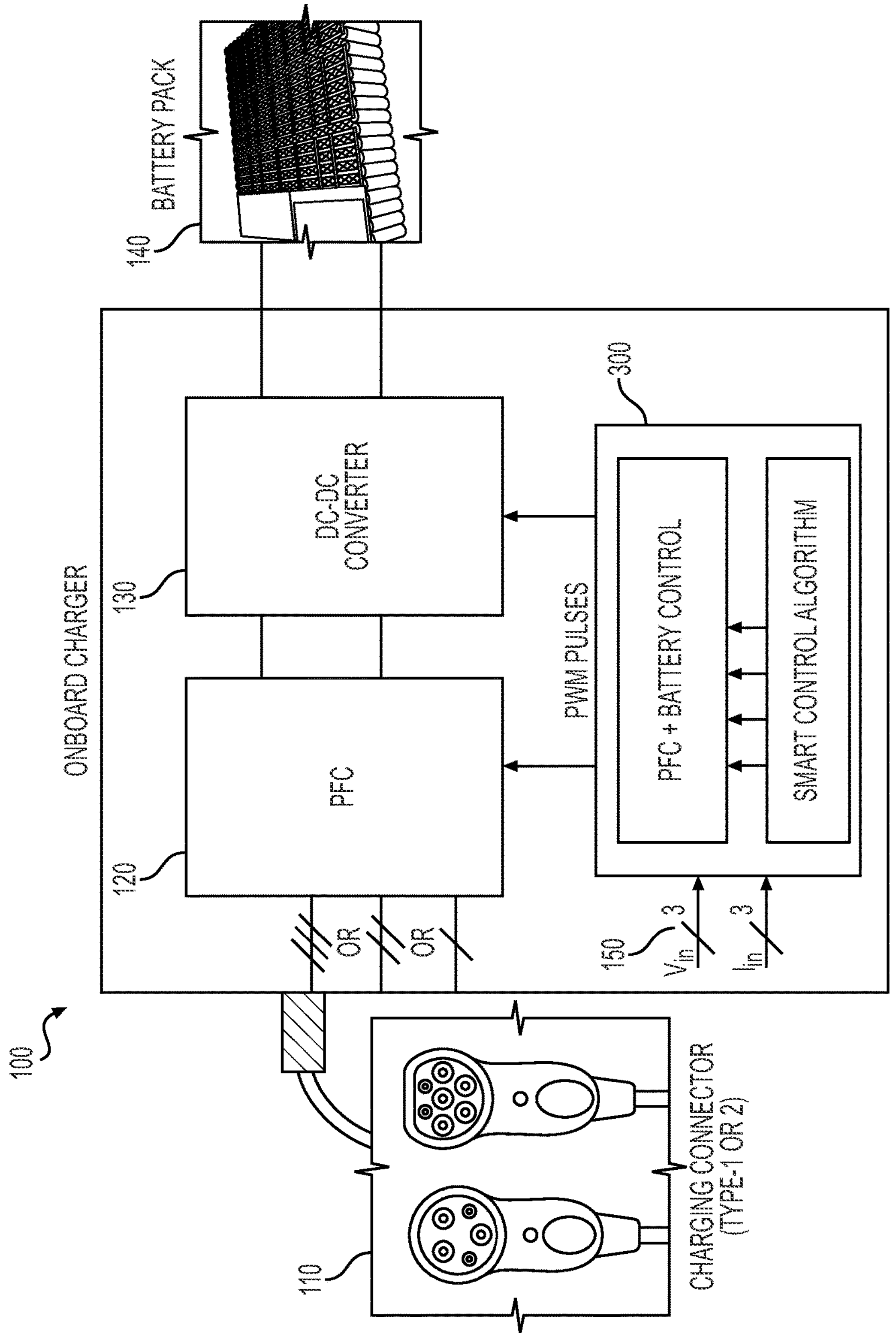
FIG. 1 depicts an exemplary system infrastructure for a battery charger, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

Various embodiments of the present disclosure relate generally to systems and methods for capacitor discharge and, more particularly, to systems and methods for capacitor discharge and energy storage in a bidirectional on-board charger.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

According to one or more embodiments, a charger may operate with a single-phase or three-phase AC power source. The charger may be designed to support a wide range of HV battery voltage ranges, for example, 400V and 800V systems and maximum output power of 11 kilowatts and 22 kilowatts. A DC-DC Converter with an LLC resonant structure may be used. A PFC converter with a single-phase or three-phase power supply may be employed.

A battery charger according to the disclosure may operate with multiple types of AC input power supplies, including single phase, split/dual/two phase, and three-phase power supplies. The charger may be compatible with a wide range of configuration. An Inductor-Inductor-Capacitor (LLC) converter may be used as a second stage converter using a DC link voltage generated from the PFC as the input voltage for the converter. However, the disclosure is not limited thereto.

The input and output layout of the charger may follow automotive standards. A battery charger according to the disclosure may include a two-stage configuration, including an AC-DC power factor correction converter stage and an isolated DC-DC converter stage. The isolated DC-DC converter may include a full-bridge driver configuration with resonant tank elements to achieve better efficiency. The DC-DC converter may be designed to charge the battery from minimum voltage to maximum voltage.

A battery charger according to the disclosure may operate as a battery charger only, or operate bidirectionally for a charging operation or a power supply operation. The converter may either receive power from an AC power source and provide DC power to a battery, or receive power from the battery and provide power as an AC power source. A vehicle to grid (V2G) configuration may be achieved with a designed control strategy for single-phase, two-phase, and three-phase systems. Switches of the battery charger may be any devices, such as GTO, thyristors, or MOSFETs/IGBTs with series diodes, for example. These switches may also be mechanical components (such as relays or contactors) if sufficient failure rates and arcing conditions during operation are met. Additionally, if the switches are semi-permanent in position, the switches may be implemented as one or more jumper connectors or dual in-line package (DIP) switches.

Electric vehicles, energy storage systems, and backup generators, for example, convert electric power from one form to another. Additionally, an on-board charger for a vehicle, for example, may have a dual purpose. The on-board charger may be a bi-directional system that converts AC voltage to DC voltage in a charging mode (grid-to-battery) and DC voltage to AC voltage in a discharge or inverter mode (battery-to-grid). The charging mode may convert the grid AC into DC voltage to charge the vehicle high voltage (HV) battery, and the discharge or inverter mode may convert the HV battery DC voltage into AC voltage that may be supplied to grid line voltage, be supplied as a backup generator to power a house when the grid is down, or as an inverter to supply voltage to vehicle AC outlets, for example. The on-board charger may have a two-stage design to meet automotive requirements, with an AC-DC power factor converter in a first stage and an isolated DC-DC converter in a second stage.

In a charge mode, the AC-DC power factor converter in the first stage may convert input power from an AC grid system to a required DC bulk capacitor voltage while ensuring the AC current is within limits and the power factor is close to unity. At the start of the charge mode, the bulk capacitor may be de-energized completely, so the AC-DC power factor converter may pre-charge the bulk capacitor to avoid inrush current scenarios. When the pre-charge process is complete, the AC-DC power factor converter may operate in a fixed switching frequency and variable duty cycle mode to regulate the bulk capacitor voltage at a desired voltage setpoint and maintain unity power factor. Systems to pre-charge the bulk capacitor and limit the inrush AC current may include a positive temperature coefficient resistor, or a normal resistor, with an appropriate continuous power rating in conjunction with a high voltage relay.

During the discharge or the inverter mode, the power factor converter, operating as an inverter, may use the bulk capacitor voltage to convert DC battery voltage into a desired AC output. The AC output may vary in voltage, frequency, and/or phase type. The power factor converter may operate in different modes to generate the AC voltage depending on the phase type required.

During charge mode, the isolated DC-DC converter in the second stage may use the bulk capacitor voltage to convert AC voltage to charge the HV battery at a commanded current. The isolated DC-DC converter may be used to maintain the HV battery voltage. A resonant isolated DC-DC converter may operate with a variable switching frequency and a fixed duty cycle to regulate the HV secondary current to the desired setpoint to charge the HV battery. In the case of a resonant isolated DC-DC converter, the switching frequency may be maintained close to the resonant frequency of the converter for a more efficient operation. The LC resonant tank network may control the resonant frequency, and the frequency range along with the transformer turn ratio may determine the DC output of the isolated DC-DC converter.

During the discharge or the inverter mode of operation, the isolated DC-DC converter may use the battery voltage to charge the bulk capacitor. The resonant isolated DC-DC converter may operate in variable or fixed frequency, and variable or fixed duty cycle modes, to ensure the bulk capacitor voltage is maintained within limits at all operating conditions from no AC load to a full AC load.

The bulk capacitor in a bi-directional on-board charger for automotive applications may be in the range of millifarads. The bulk capacitor may be one or more electrolytic capacitors with higher capacitance density. A rated capacitor voltage may differ for 400V and 800V applications, for example. A series parallel combination may be used to achieve a higher rated voltage. For example, a voltage bulk capacitor HV bus, HV− to HV+, in an 800V system may vary from 360 VDC to 850 VDC. The bulk capacitor may maintain a stable link voltage during charging and inverter mode operation of the on-board charger. The isolated DC-DC converter stage may require stable input DC voltage during battery charging operation, and the PFC converter stage, operating as an inverter, may require a stable input DC voltage during inverter mode operation.

To satisfy HV safety requirements of a bi-directional on-board charger for automotive applications, the HV bus in the system should be discharged below the HV safety value of 60V. The bulk capacitor may be internal to the on-board charger, and less externally accessible as the HV battery bus, so the requirements to discharge the bulk capacitor may be comparatively less stringent relative to the requirements to discharge HV battery bus capacitance and AC bus capacitance.

In case of loss of communication or critical faults in a vehicle, such as due to a vehicle accident, for example, all energy storage elements should be discharged. Because the bulk capacitor may be charged during these circumstances, the bulk capacitor should be discharged. However, depending on the severity of the fault, an order of discharge may give priority to discharging the HV battery bus and AC bus capacitance first.

On-board chargers may have two types of discharge mechanisms, where the two types are passive and active. Passive discharge uses a resistive element, such as a resistor, for example, to discharge the voltage across the bulk capacitor by heat dissipation on the resistive element. The resistance value may be high to minimize the continuous power dissipation, which may result in a long discharge time in the order of minutes to tens of minutes. Active discharge may switch a connection of the resistive element with the bulk capacitor by turning on and off an active device, such as a MOSFET or IGBT, for example. Because the power dissipation is not continuous, a lower resistance value may be used for active discharge relative to passive discharge.

Additionally, a much faster discharge rate may be achieved, such as in the order of a few seconds, for example.

One or more embodiments may provide a method to discharge the bulk capacitor based on the operating mode of a bi-directional on-board charger. Adding active and/or low resistance passive discharge may not meet increased efficiency requirements and/or higher power density of the on-board charger. One or more embodiments does not require additional hardware for an on-board charger. One or more embodiments may provide a controlled current scheme to discharge the bulk capacitor energy to the HV battery load or AC output load. The controlled current scheme may discharge energy even without a load to the output capacitors, but may be delayed to maintain the output capacitor voltages within limits.

One or more embodiments may provide an on-board charger with charging mode discharge conditions for a bulk capacitor, where the charging mode discharge conditions include one or more of: (1) the HV battery is connected to the on-board charger, (2) a critical hardware-related fault is not present in either the AC-DC power factor converter or the isolated DC-DC converter, (3) an on-board charger command is a standby operation, or (4) an AC voltage may be lost if a charging plug is removed in the middle of a charging event.

One or more embodiments may determine that all the charging mode discharge conditions are met, then begin the discharge operation of the bulk capacitor. When an input AC voltage is present, then the discharge process will continue until the bulk capacitor voltage is equal to a peak voltage of the input AC voltage plus a predetermined hysteresis. The predetermined hysteresis may be 10V, for example. If the AC grid voltage is disconnected from the bulk capacitor, the discharge process will continue until the bulk capacitor voltage is below a threshold, such as 60V, for example.

During the bulk capacitor charging mode discharge process, the isolated DC-DC converter may be operational and the AC-DC power factor converter may be non-operational. In a non-operational state, all switches may be open, for example. The isolated DC-DC converter may discharge the bulk capacitor energy into the HV battery with a predetermined current reference. If the HV battery is not connected, the current reference may be modified to ensure the HVDC output capacitor voltage is within limits. For example, a predetermined current reference may be a reference up to 40 A, and a modified current reference may be 0.5 A to avoid overcharging output capacitors.

One or more embodiments may provide an on-board charger with inverter mode discharge conditions for a bulk capacitor, where the inverter mode discharge conditions include one or more of: (1) a critical hardware-related fault is not present in either the AC-DC power factor converter or the isolated DC-DC converter, or (2) an on-board charger command is a standby operation.

One or more embodiments may determine that all the inverter mode discharge conditions are met, then begin the discharge operation of the bulk capacitor. During the discharge process, the isolated DC-DC converter may be non-operational and the power factor converter may be operational. The power factor converter may discharge the bulk capacitor energy to the AC output load with a predetermined current reference. If the AC output load is disconnected, the current reference may be modified to ensure the AC output capacitor voltage is within limits. One or more embodiments may discharge the bulk capacitor voltage to below a threshold, such as 60V, for example.

One or more embodiments may provide a discharge of high voltage bus capacitance. The HV bus capacitance may include the output capacitance of the isolated DC-DC converter. The output capacitance may be a high voltage filter capacitor that filters high frequency ripple to the HV battery. The high voltage filter capacitor may be in the range of microfarads for on-board charger applications. In one or more embodiments, if the HV battery is disconnected, the HV bus capacitance may be discharged into the bulk capacitor in a controlled manner. One or more embodiments may control the discharge of the HV filter capacitor to the bulk capacitor to transfer electrical energy from terminals that are exposed when the battery is disconnected from the HVDC to the bulk capacitor, wherein the bulk capacitor is less exposed to external sources than the HV filter capacitor.

In one or more embodiments, in charge mode or inverter mode, if the HV battery gets disconnected, both the power factor converter and the isolated DC-DC converter may enter a fault mode and stop power conversion. Next, the isolated DC-DC converter may set a predetermined current reference and begin discharging the HV bus capacitance into the bulk capacitor. Regardless of the modes of operation (charge or inverter), the secondary side (HV battery) switch (es) may be operated to discharge the HV bus capacitance into the bulk capacitor. The primary side (bulk capacitor) switch(es) may be turned off so that the body diodes of the switch(es) create a path for the discharge.

In one or more embodiments, a discharge from the HV bus to bulk capacitor may increase the bulk capacitor voltage by only a few volts. For example, if the HV bus capacitor, which may be less than approximately 20 μF, is charged to 900V and the HV battery is disconnected, then the discharge to the bulk capacitor, which may be approximately 1 mF, and charged to approximately 800V may begin. Considering an energy transfer from HV bus capacitor to the bulk capacitor until the HV bus capacitor voltage falls below 60V, the bulk capacitor voltage would only increase from 800V to 810V, which is a 10V increase.

One or more embodiments may provide a bi-directional on-board charger with a system to discharge a bulk capacitor and HV bus capacitor, without using additional hardware components. One or more embodiments may provide a current-controlled method to discharge the capacitors to improve capacitor life and reduce the deterioration of the circuit components. One or more embodiments may provide a system able to handle high current so that discharge speed may be increased. One or more embodiments may provide a system to discharge the bulk capacitor into the HV battery load during a forward charging (grid-to-battery) operation and into the AC load during a reverse charging (battery-to-grid) operation. One or more embodiments may use current limits so that the HV bus capacitor and AC output capacitor voltages are within limits. One or more embodiments may discharge the HV bus capacitor into the bulk capacitor upon disconnection from the HV battery.

Some designs for capacitor discharge use passive discharge methods or active discharge methods. Passive discharge uses a continuously connected resistor, which reduces efficiency and thermal performance. Active discharge requires hardware updates, such as additional FETs, power supplies, and controllers, for example, and a thermal handling capability of the active discharge resistor must be considered for multiple discharge attempts.

One or more embodiments may provide a system that uses the HV DC-DC stage to discharge the bulk capacitor into the HV battery load during a forward charging (grid-to-battery) operation. One or more embodiments may control a current of the discharge using a current loop, without additional hardware. One or more embodiments may provide a system that, if the HV battery load is disconnected, uses a combination of the current and voltage loop to discharge the bulk capacitor while ensuring the HV bus capacitor voltage is within limits.

One or more embodiments may provide a system that uses the PFC stage to discharge the bulk capacitor into the AC load during a reverse charging (battery-to-grid) operation. One or more embodiments may control a current of the discharge using a current loop, without additional hardware. One or more embodiments may provide a system that, if the AC load is disconnected, uses a combination of the current and voltage loop to discharge the bulk capacitor while ensuring the AC bus capacitor voltage is within limits.

One or more embodiments may provide a system that, if the HV bus gets disconnected from the HV battery, discharges the energy stored in the HV bus into the bulk capacitor by operating the HV DC-DC converter in reverse mode. One or more embodiments may set an appropriate current reference to control the rate of the discharge. One or more embodiments may provide a system that transfers energy from the HV bus capacitor to the bulk capacitor with a very small increase in bulk capacitor voltage.

FIG. 1 depicts an exemplary system infrastructure for a battery charger, according to one or more embodiments. As shown in FIG. 1, a battery charger 100 may include or be electrically connectable to a charging connector 110. The charging connector 110 may provide an electrical connection from an external power supply to the battery charger 100, and may be a Type 1 or a Type 2 connector, for example. The charging connector 110 may transfer single phase, two-phase, or three phase power.

The battery charger 100 may include a Power Factor Correction (PFC) converter 120, an HV DC-DC converter (HVDC) 130, and a controller 300 receiving signals from input sensor 150. Power Factor Correction (PFC) converter 120 may be an AC-DC converter. HV DC-DC converter (HVDC) 130 may be a DC-DC converter. Controller 300 may include one or more controllers. The battery charger 100 may include or be electrically connectable to an HV battery 140. The battery charger 100 may be used in automotive vehicles as an onboard charger to transfer power from an external power source through charging connector 110 to HV battery 140 in a grid-to-battery operation, or to transfer power from HV battery 140 in a vehicle to grid configuration (a battery-to-grid operation). The battery charger 100 may be included in a system provided as an electric vehicle including a motor configured to rotate based on power received from the HV battery 140.

Figure 2:
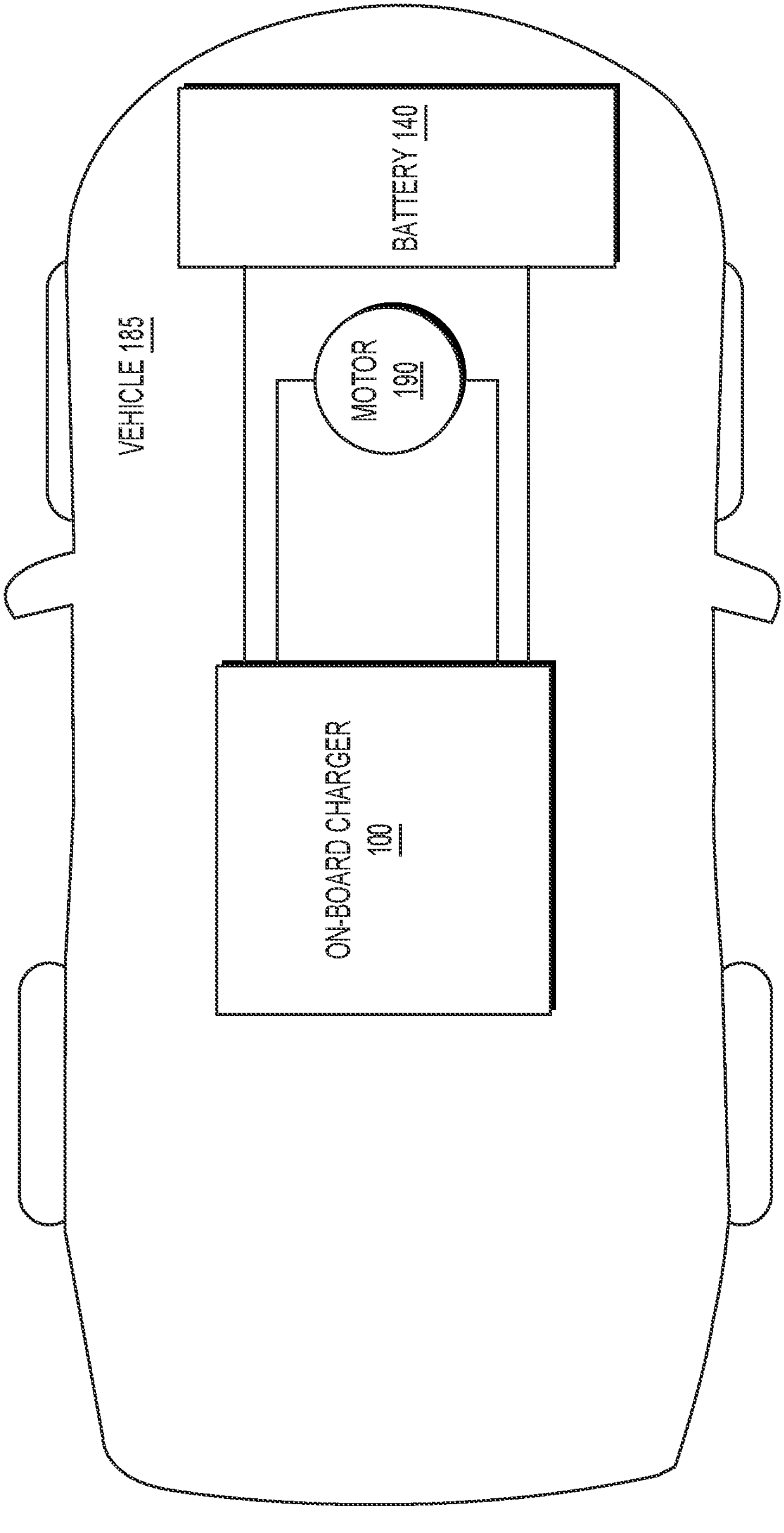
FIG. 2 depicts an exemplary system infrastructure for a vehicle including a battery charger, according to one or more embodiments.

FIG. 2 depicts an exemplary system infrastructure for a vehicle including a battery charger, according to one or more embodiments. The battery charger 100 may be a combined inverter and converter. As shown in FIG. 2, electric vehicle 185 may include battery charger 100, motor 190, and battery 140. Battery charger 100 may include components to receive electrical power from an external source and output electrical power to charge battery 140 of electric vehicle 185. Battery charger 100 may convert DC power from battery 140 in electric vehicle 185 to AC power, to drive motor 190 of the electric vehicle 185, for example, but the embodiments are not limited thereto. For example, battery charger 100 may include components to receive electrical power from an external source and output electrical power to charge battery 140 without motor 190 connected to battery charger 100. Battery charger 100 may be bidirectional, and may convert DC power to AC power, or convert AC power to DC power, such as during regenerative braking, for example. Battery charger 100 may be a three-phase inverter, a single-phase inverter, or a multi-phase inverter.

Figure 3:
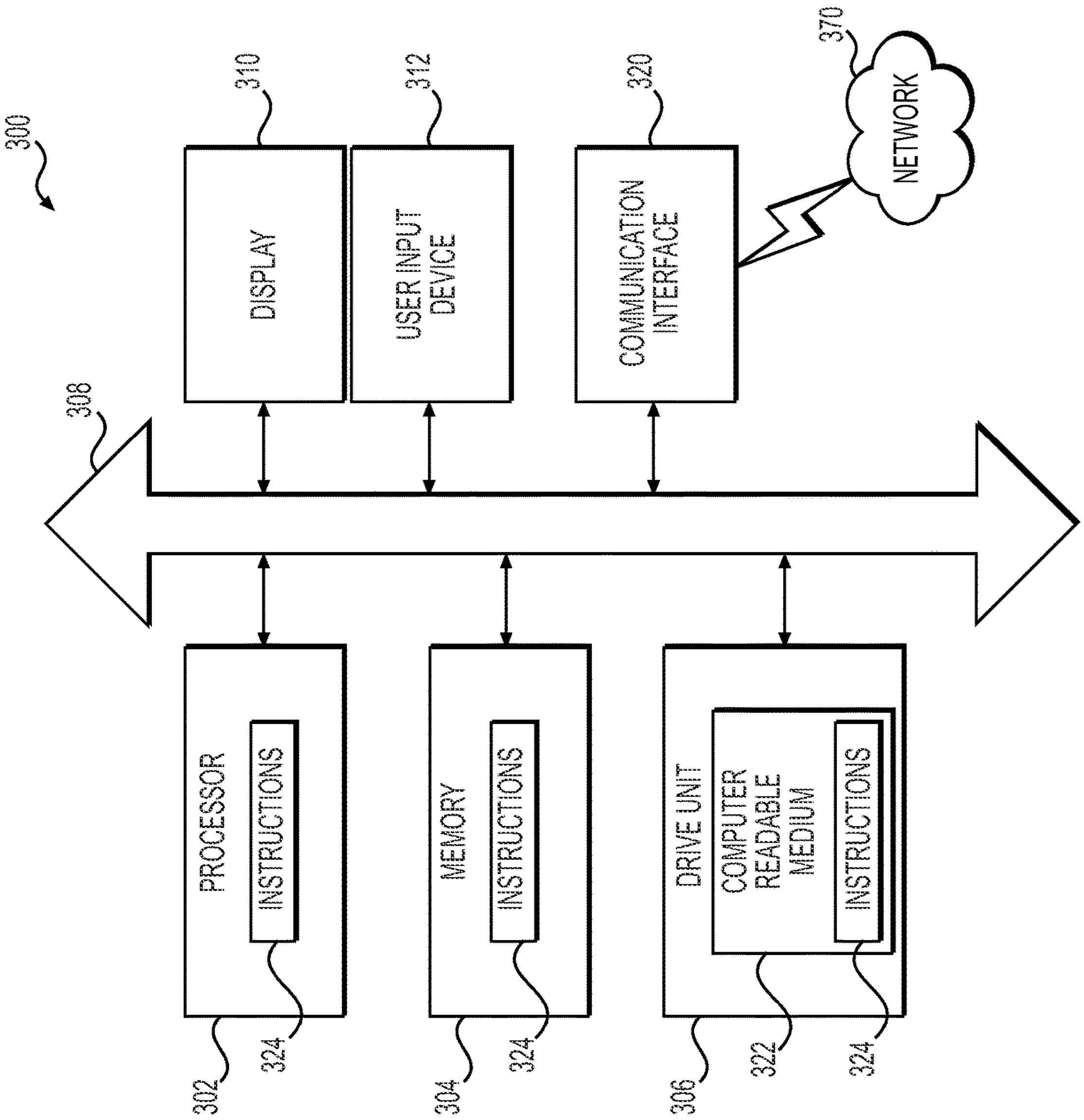
FIG. 3 depicts an implementation of a computer system that may execute techniques presented herein, according to one or more embodiments.

FIG. 3 depicts an implementation of a controller 300 that may execute techniques presented herein, according to one or more embodiments.

Any suitable system infrastructure may be put into place to allow control of the battery charger. FIG. 3 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 3. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The controller 300 may include a set of instructions that can be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
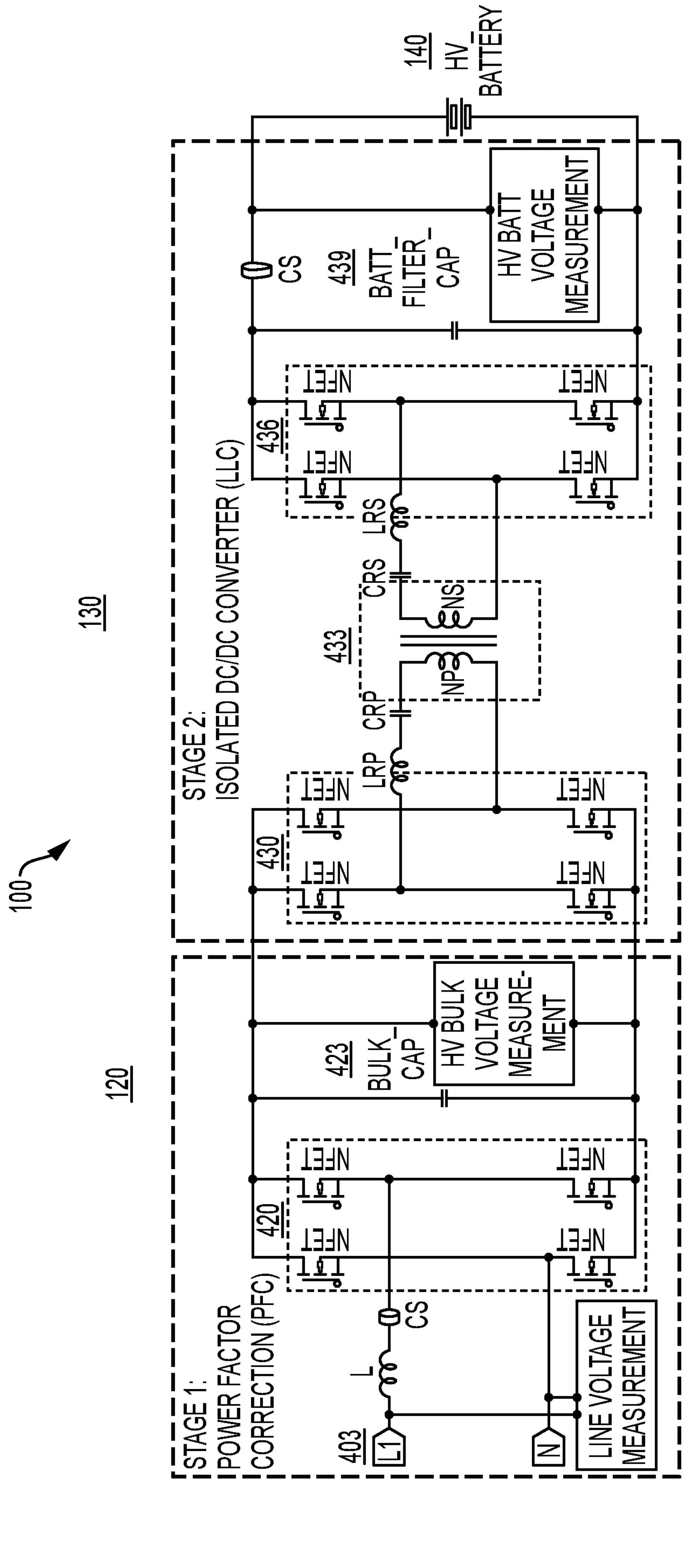
FIG. 4 depicts an exemplary electrical schematic for a single-phase battery charger with a bulk capacitor and a high voltage filter capacitor, according to one or more embodiments.

FIG. 4 depicts an exemplary electrical schematic for a single-phase battery charger with a bulk capacitor and a high voltage filter capacitor, according to one or more embodiments. As shown in FIG. 4, battery charger 100 may include PFC converter 120 and HV DC-DC converter 130. PFC converter 120 may be connected to line voltage 403, which may be a single-phase voltage, for example. HV DC-DC converter 130 may be connected to battery 140. HV DC-DC converter 130 may be operable to isolate PFC converter 120 from HV battery 140. For example, HV DC-DC converter 130 may be a CLLLC converter, or any suitable DC-DC converter.

PFC converter 120 may include PFC converter switch 420 and bulk capacitor 423. PFC converter switch 420 may be one or more switches, such as four NFET switches, for example, as shown in FIG. 4. PFC converter 120 may include other components, such as inductor L, current sensor CS, line voltage detector, and bulk capacitor voltage detector, for example.

HV DC-DC converter 130 may include bridge driver switch 430, one or more transformers 433, bridge rectifier switch 436, and HV filter capacitor 439. Bridge driver switch 430 may be one or more switches, such as four NFET switches, for example, as shown in FIG. 4. Bridge rectifier switch 436 may be one or more switches, such as four NFET switches, for example, as shown in FIG. 4. PFC converter 120 may include other components, such as primary side inductor LRP, secondary side inductor LRS, primary side capacitor CRP, secondary side capacitor CRS, current sensor CS, and battery voltage detector, for example.

The battery charger 100 may operate bidirectionally. A vehicle to grid (V2G) configuration may be achieved with a designed control strategy for multiple voltages. The PFC converter 120 may be configured to receive DC power from HV battery 140 through HV DC-DC converter 130, convert the DC power to AC power, and provide the AC power as an output to line voltage 403. The controller 300 may be designed with an algorithm to control an operation of the PFC converter 120 and HV DC-DC converter 130.

Bridge driver switch 430 may be operated as a full bridge driver or a half bridge driver, and transmit power as a square-wave signal from PFC converter 120 to one or more transformers 433. One or more transformers 433 may be one or more high-frequency transformers and may be a single transformer with multiple coils or windings, multiple transformers with single coils or windings, or any combination thereof. One or more transformers 433 may be connected to bridge rectifier switch 436. Bridge rectifier switch 436 may convert the square-wave signal to DC power.

Controller 300 may be designed with and/or configured to execute an algorithm for control of the PFC converter switch 420, bridge driver switch 430, and bridge rectifier switch 436.

Figure 5:
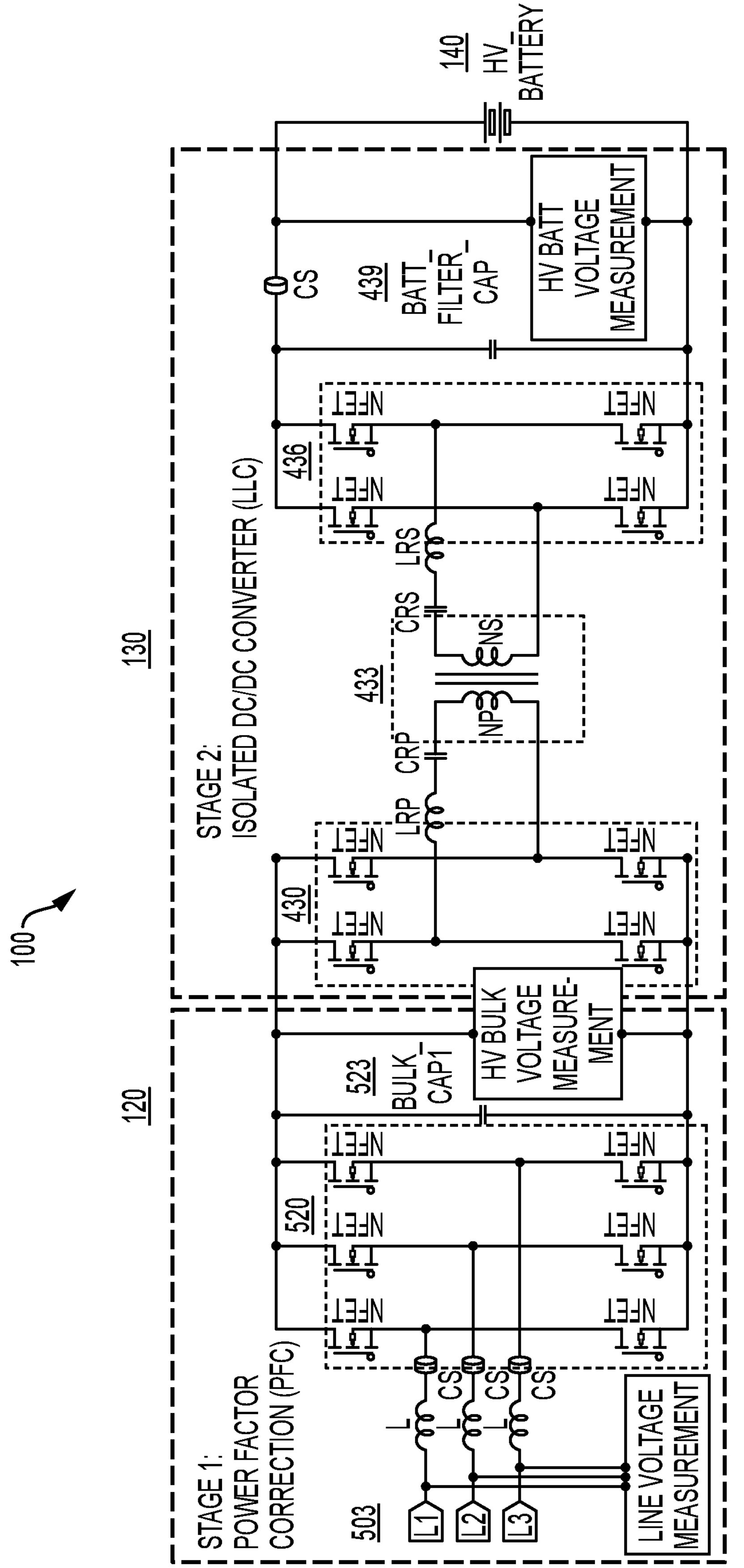
FIG. 5 depicts an exemplary electrical schematic for a three-phase battery charger with a bulk capacitor and a high voltage filter capacitor, according to one or more embodiments.

FIG. 5 depicts an exemplary electrical schematic for a three-phase battery charger with a bulk capacitor and a high voltage filter capacitor, according to one or more embodiments.

As shown in FIG. 5, battery charger 100 may include PFC converter 120 and HV DC-DC converter 130. PFC converter 120 may be connected to line voltage 503, which may be a three-phase voltage, for example. HV DC-DC converter 130 may be connected to battery 140. HV DC-DC converter 130 may be operable to isolate PFC converter 120 from HV battery 140. For example, HV DC-DC converter 130 may be a CLLLC converter, or any suitable DC-DC converter.

PFC converter 120 may include PFC converter switch 520 and bulk capacitor 523. PFC converter switch 520 may be one or more switches, such as six NFET switches, for example, as shown in FIG. 5. PFC converter 120 may include other components, such as an inductor L and current sensor CS for each input phase, line voltage detector, and bulk capacitor voltage detector, for example.

HV DC-DC converter 130 may include bridge driver switch 430, one or more transformers 433, bridge rectifier switch 436, and HV filter capacitor 439. Bridge driver switch 430 may be one or more switches, such as four NFET switches, for example, as shown in FIG. 5. Bridge rectifier switch 436 may be one or more switches, such as four NFET switches, for example, as shown in FIG. 5. PFC converter 120 may include other components, such as primary side inductor LRP, secondary side inductor LRS, primary side capacitor CRP, secondary side capacitor CRS, current sensor CS, and battery voltage detector, for example.

The battery charger 100 may operate bidirectionally. A vehicle to grid (V2G) configuration may be achieved with a designed control strategy for multiple voltages. The PFC converter 120 may be configured to receive DC power from HV battery 140 through HV DC-DC converter 130, convert the DC power to AC power, and provide the AC power as an output to line voltage 503. The controller 300 may be designed with an algorithm to control an operation of the PFC converter 120 and HV DC-DC converter 130.

Bridge driver switch 430 may be operated as a full bridge driver or a half bridge driver, and transmit power as a square-wave signal from PFC converter 120 to one or more transformers 433. One or more transformers 433 may be one or more high-frequency transformers and may be a single transformer with multiple coils or windings, multiple transformers with single coils or windings, or any combination thereof. One or more transformers 433 may be connected to bridge rectifier switch 436. Bridge rectifier switch 436 may convert the square-wave signal to DC power.

Controller 300 may be designed with and/or configured to execute an algorithm for control of the PFC converter switch 520, bridge driver switch 430, and bridge rectifier switch 436.

Figure 6:
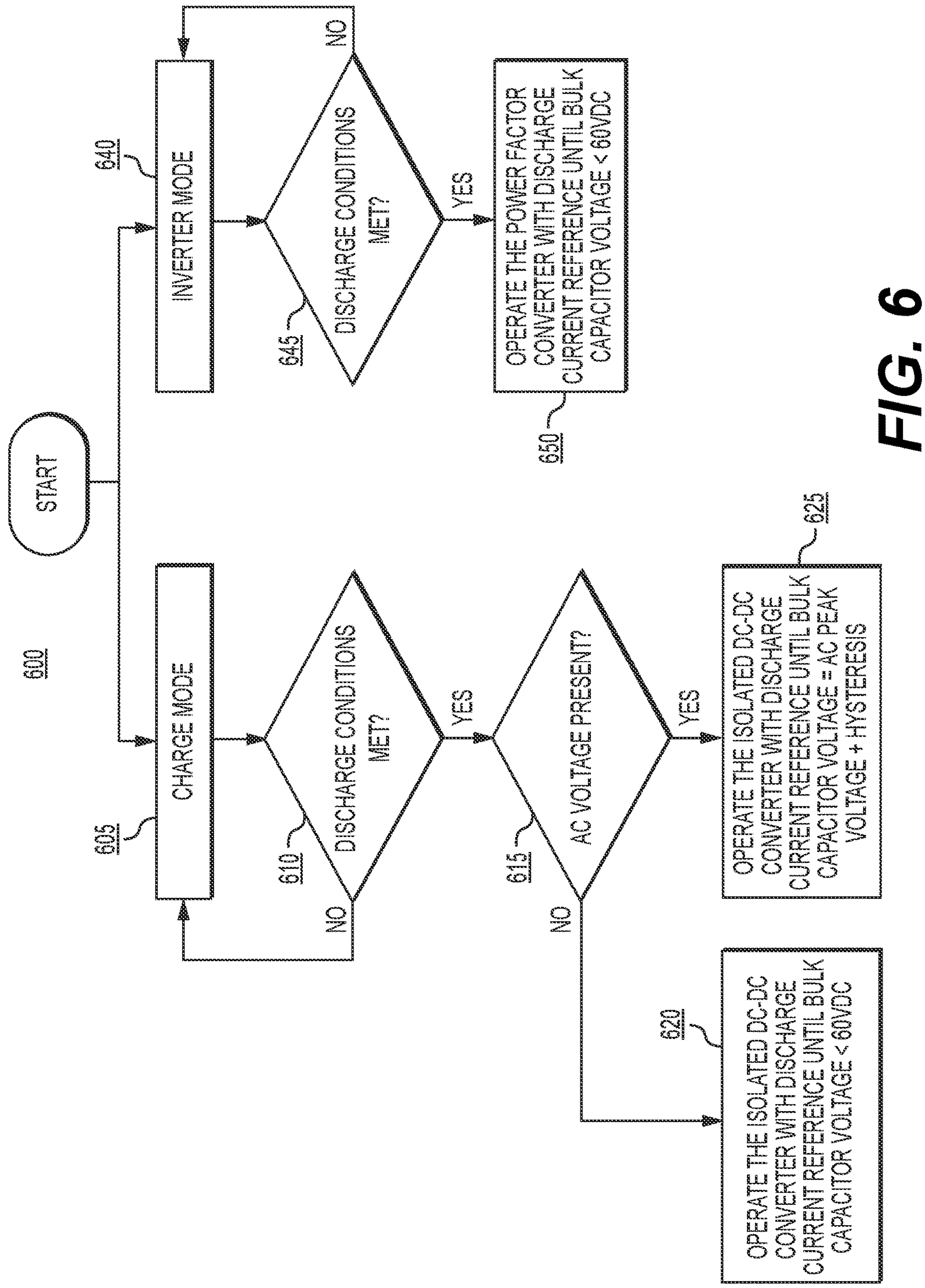
FIG. 6 depicts an exemplary method for controlling a discharge of a bulk capacitor, according to one or more embodiments.

FIG. 6 depicts an exemplary method for controlling a discharge of a bulk capacitor, according to one or more embodiments. As shown in FIG. 6, method 600 for controlling a discharge of a bulk capacitor may include determining whether the charger is in a charge mode (operation 605) or an inverter mode (operation 640).

When the charger is determined to be in a charge mode (operation 605), method 600 may include determining whether discharge conditions are met (operation 610). When discharge conditions are not met (operation 610), method 600 may return to operation 605. When discharge conditions are met (operation 610), method 600 may include determining whether an AC voltage (line voltage) is present (operation 615). When AC voltage (line voltage) is not present (operation 615), method 600 may include operating the isolated DC-DC converter with a discharge current reference until the bulk capacitor is less than a threshold voltage, such as 60V, for example (operation 620). When AC voltage (line voltage) is present (operation 615), method 600 may include operating the isolated DC-DC converter with a discharge current reference until the bulk capacitor is equal to an AC peak voltage plus a hysteresis (operation 625). For a three-phase input, a peak voltage may be a peak voltage per input line multiplied by $\sqrt{3}$.

When the charger is determined to be in an inverter mode (operation 640), method 600 may include determining whether discharge conditions are met (operation 645). When discharge conditions are not met (operation 645), method 600 may return to operation 640. When discharge conditions are met (operation 645), method 600 may include operating the PFC converter with a discharge current reference until the bulk capacitor is less than a threshold voltage, such as 60V, for example (operation 650).

Method 600 may control a battery charger 100 including an alternating current (AC) to DC Power Factor Correction (PFC) converter 120 and a high voltage (HV) direct current (DC) to DC converter (HVDC) 130 connected to the PFC converter 120. PFC converter 120 may include a bulk capacitor 423 and a PFC converter switch 420 connectable to a line voltage 403. HVDC 130 may include one or more transformers 433 having a secondary side connectable to a battery 140, and a bridge driver connected to a primary side of the one or more transformers 433. Bridge driver may include a bridge driver switch 430.

Method 600 may include performing, by one or more controllers 300, operations including controlling an operation of the bridge driver switch 430 to control a discharge of the bulk capacitor 423 to the battery 140 at an end of a grid-to-battery operation, the grid-to-battery operation to supply electric power from the line voltage 403 to the battery 140.

The operations of method 600 may include controlling an operation of the bridge driver switch 430 to control a discharge of the bulk capacitor 423 to the battery 140 in one or more of the grid-to-battery operation or a battery-to-grid operation, the battery-to-grid operation to supply electric power from the battery 140 to a load of the line voltage 403. The operations of method 600 may include controlling an operation of the PFC converter switch 420 to control the discharge of the bulk capacitor 423 to a load of the line voltage 403 in the battery-to-grid operation. The operations of method 600 may include controlling the discharge of the bulk capacitor 423 to the battery 140 at the end of a grid-to-battery operation based on the battery 140 being connected to the HVDC 130, and no hardware-related faults in the PFC converter 120 or the HVDC 130.

The operations of method 600 may include controlling the discharge of the bulk capacitor 423 to the battery 140 while a voltage of the bulk capacitor 423 is above a peak voltage of the line voltage 403 plus a hysteresis factor, when the line voltage 403 is connected to the PFC converter 120. The operations of method 600 may include controlling the discharge of the bulk capacitor 423 to the battery 140 while the voltage of the bulk capacitor 423 is above a threshold, when the line voltage 403 is disconnected from the PFC converter 120.

The operations of method 600 may include controlling the discharge of the bulk capacitor 423 to the battery 140 based on a current threshold, and modifying the current threshold based on a change in a connection of PFC converter 120 or HVDC 130 to one or more of the line voltage 403 or the battery 140. Method 600 may include operating the bridge driver switch 430 to control a discharge of the bulk capacitor 423 to the battery 140 at an end of a grid-to-battery operation, the grid-to-battery operation to supply electric power from the line voltage 403 to the battery 140.

Figure 7:
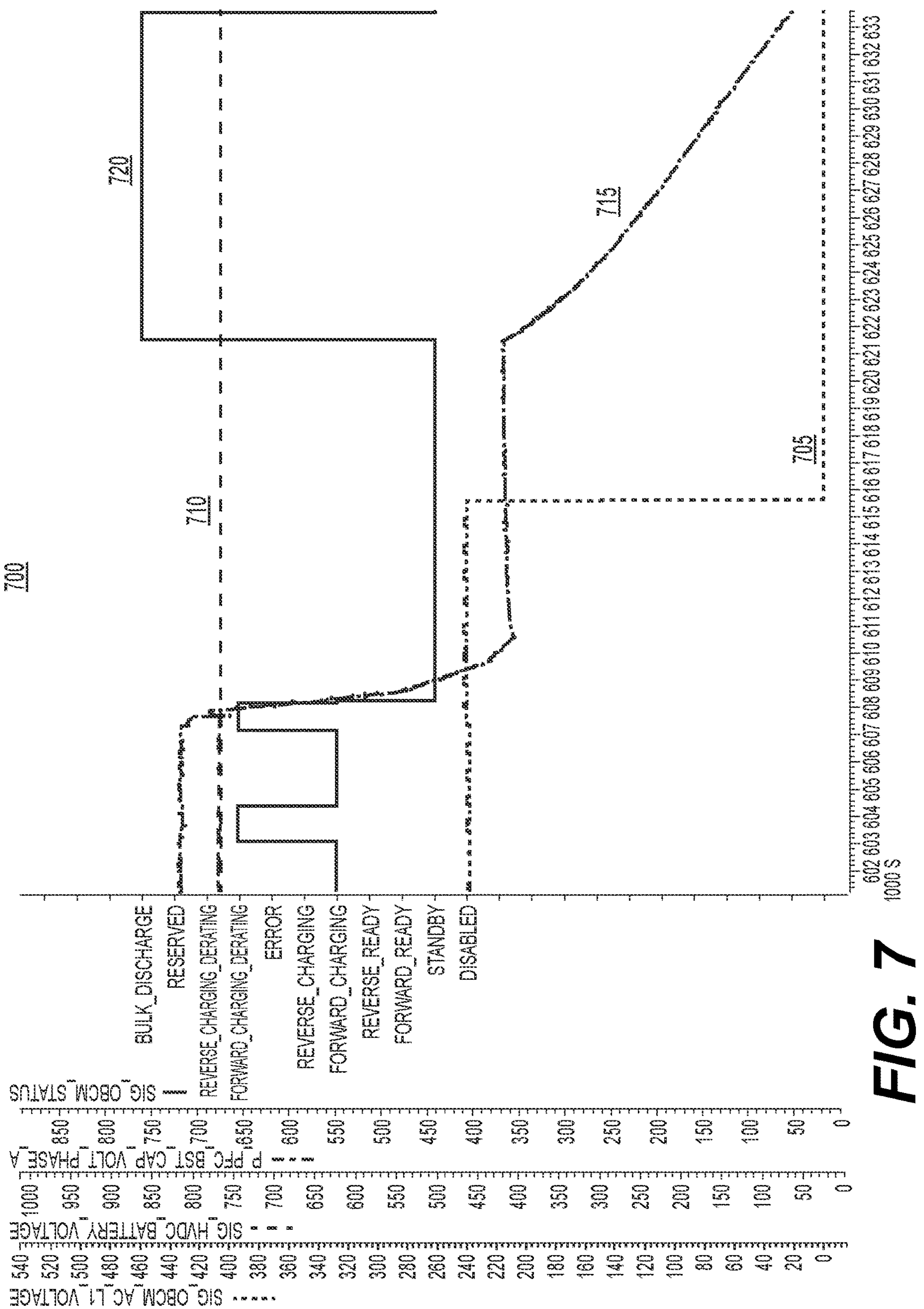
FIG. 7 depicts an exemplary plot for a discharge of a bulk capacitor in a control system, according to one or more embodiments.

FIG. 7 depicts an exemplary plot for a discharge of a bulk capacitor in a control system, according to one or more embodiments. As shown in FIG. 7, plot 700 includes AC voltage 705, HVDC battery voltage 710, bulk capacitor voltage 715, and charger state 720. The period of time from 602 seconds to 633 seconds depicts a transition from an end of a charging operation of HVDC battery voltage 710 to approximately 775V, as indicated by charger state 720 transitioning between "forward_charging" and "forward_charging_derating" states, to an end of a discharge operation.

At 608 seconds, charger state 720 transitions to a "standby" state (as a discharge condition for bulk capacitor discharge), and bulk capacitor voltage 715 decreases from approximately 725V to approximately 350V, based on AC voltage 705 at 240V. At 616 seconds, AC voltage 705 decreases to 0V. At 622 seconds, charger state 720 transitions to "bulk_discharge" state to discharge bulk capacitor voltage 715 to approximately 50V at 633 seconds.

Figure 8:
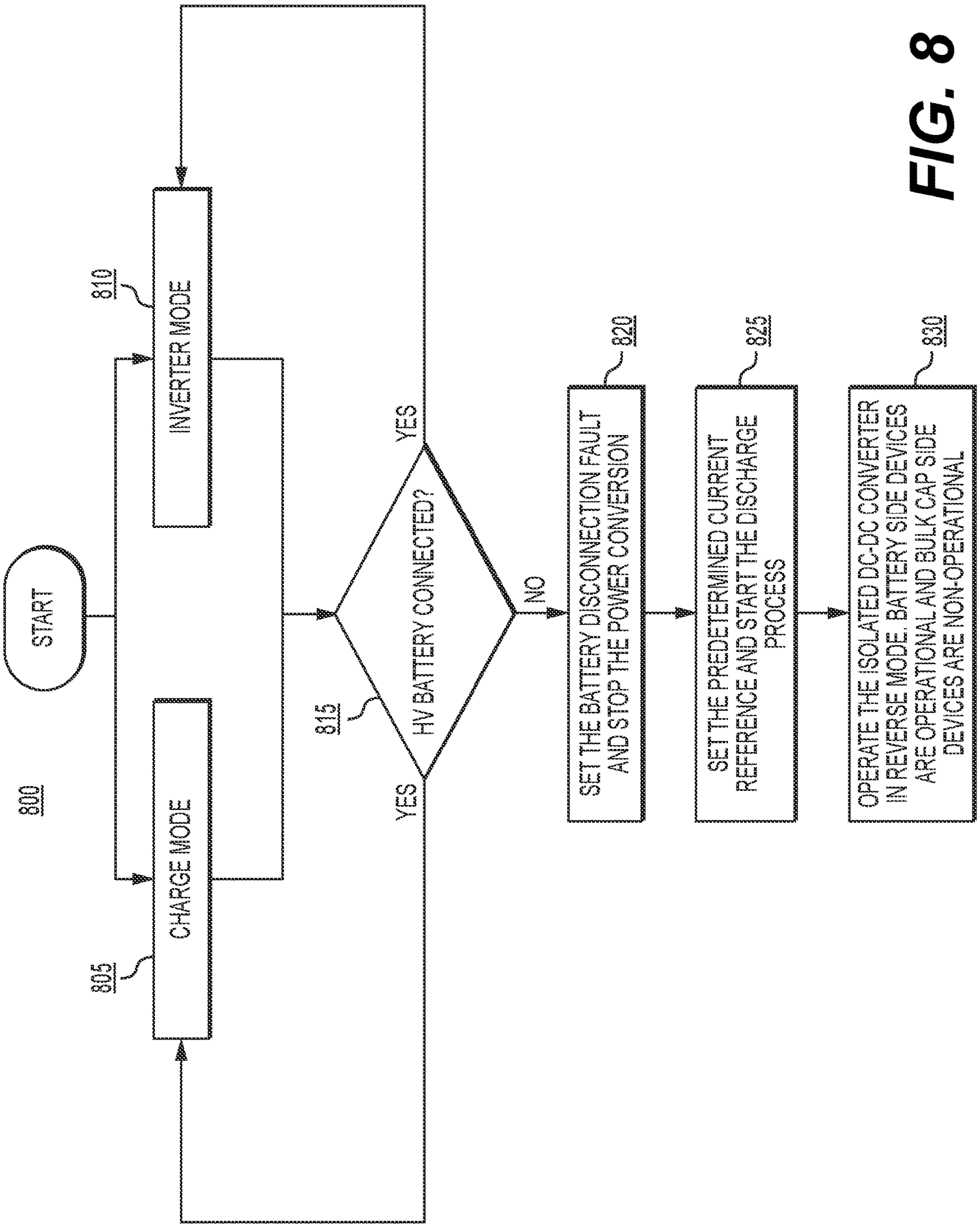
FIG. 8 depicts an exemplary method for controlling a discharge of a high voltage filter capacitor, according to one or more embodiments.

FIG. 8 depicts an exemplary method for controlling a discharge of a high voltage filter capacitor, according to one or more embodiments. As shown in FIG. 8, method 800 for controlling a discharge of a high voltage filter capacitor may include determining whether the charger is in a charge mode (operation 805) or an inverter mode (operation 810).

When the charger is in either a charge mode (operation 805) or an inverter mode (operation 810), method 800 may determine whether the HV battery is connected (operation 815). When the HV battery is connected (operation 815), method 800 may return to operation 805 and operation 810. When the HV battery is not connected (operation 815), method 800 may set the battery disconnection fault and stop the power conversion (operation 820). Next, method 800 may set the predetermined current reference and start the discharge process (operation 825). Next, method 800 may operate the DC-DC converter in a reverse mode (battery-to-grid), where the secondary (battery) side switches are operational and the primary (bulk capacitor) side switches are non-operational (operation 830).

Method 800 may control a battery charger 100 including an alternating current (AC) to DC Power Factor Correction (PFC) converter 120 and a high voltage (HV) direct current (DC) to DC converter (HVDC) 130 connected to the PFC converter 120. PFC converter 120 may include a bulk capacitor 423. PFC converter 120 may be connectable to a line voltage 403. HVDC 130 may include one or more transformers 433 having a secondary side connectable to a battery 140, a bridge rectifier connected to a secondary side of the one or more transformers 433, the bridge rectifier including a bridge rectifier switch 436, and a HV filter capacitor 439.

Method 800 may include performing, by one or more controllers 300, operations including controlling an operation of the bridge rectifier switch 436 to control a discharge of the HV filter capacitor 439 to the bulk capacitor 423.

The operations of method 800 may include controlling the operation of the bridge rectifier switch 436 to control the discharge of the HV filter capacitor 439 to the bulk capacitor 423 in each of a grid-to-battery operation and a battery-to-grid operation, the grid-to-battery operation to supply electric power from the line voltage 403 to the battery 140 and the battery-to-grid operation to supply electric power from the battery 140 to a load of the line voltage 403.

The operations of method 800 may include determining whether the battery 140 is connected to the HVDC 130, and controlling the operation of the bridge rectifier switch 436 to control the discharge of the HV filter capacitor 439 to the bulk capacitor 423, when the battery 140 is determined to be disconnected from the HVDC 130. The operations of method 800 may include setting a battery disconnect fault and ending one or more of the grid-to-battery operation or the battery-to-grid operation, when the battery 140 is determined to be disconnected from the HVDC 130.

The operations of method 800 may include determining a current threshold, and controlling the operation of the bridge rectifier switch 436 to control the discharge of the HV filter capacitor 439 to the bulk capacitor 423, when the one or more of the grid-to-battery operation or the battery-to-grid operation has ended. Method 600 may include operating the bridge rectifier switch 436 to control a discharge of the HV filter capacitor 439 to the bulk capacitor 423.

One or more embodiments may provide a system that uses the HV DC-DC stage to discharge the bulk capacitor into the HV battery load during a forward charging (grid-to-battery) operation. One or more embodiments may control a current of the discharge using a current loop, without additional hardware. One or more embodiments may provide a system that, if the HV battery load is disconnected, uses a combination of the current and voltage loop to discharge the bulk capacitor while ensuring the HV bus capacitor voltage is within limits.

One or more embodiments may provide a system that uses the PFC stage to discharge the bulk capacitor into the AC load during a reverse charging (battery-to-grid) operation. One or more embodiments may control a current of the discharge using a current loop, without additional hardware. One or more embodiments may provide a system that, if the AC load is disconnected, uses a combination of the current and voltage loop to discharge the bulk capacitor while ensuring the AC bus capacitor voltage is within limits.

One or more embodiments may provide a system that, if the HV bus gets disconnected from the HV battery, discharges the energy stored in the HV bus into the bulk capacitor by operating the HV DC-DC converter in reverse mode. One or more embodiments may set an appropriate current reference to control the rate of the discharge. One or more embodiments may provide a system that transfers energy from the HV bus capacitor to the bulk capacitor with a very small increase in bulk capacitor voltage.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system comprising:

an alternating current (AC) to direct current (DC) converter (AC-DC converter) including:

a bulk capacitor, and an AC-DC converter switch connectable to a line voltage;

a DC to DC converter (DC-DC converter) connected to the AC-DC converter, the DC-DC converter including:

one or more transformers having a secondary side connectable to a battery, and a bridge driver connected to a primary side of the one or more transformers, the bridge driver including a bridge driver switch; and one or more controllers configured to:

control an operation of the bridge driver switch to control a discharge of the bulk capacitor to the battery at an end of a grid-to-battery operation, the grid-to-battery operation to supply electric power from the line voltage to the battery, and control the discharge of the bulk capacitor to the battery while a voltage of the bulk capacitor is above a peak voltage of the line voltage plus a hysteresis factor, when the line voltage is connected to the AC-DC converter.

2. The system of claim 1, wherein the one or more controllers are further configured to control an operation of:

the bridge driver switch to control a discharge of the bulk capacitor to the battery in one or more of the grid-to-battery operation or a battery-to-grid operation, the battery-to-grid operation to supply electric power from the battery to a load of the line voltage, and the AC-DC converter switch to control the discharge of the bulk capacitor to the load of the line voltage in the battery-to-grid operation.

3. The system of claim 2, further comprising:

the battery connected to the DC-DC converter, wherein the system is provided as a bidirectional battery charger configured to:

receive input AC power from the line voltage through the AC-DC converter, convert the AC power to DC power, and supply the DC power to the battery to charge the battery in the grid-to-battery operation, and receive DC power from the battery through the DC-DC converter, convert the DC power to AC power, and supply the AC power to the load of the line voltage as output AC power in the battery-to-grid operation.

4. The system of claim 2, further comprising:

an electric vehicle including the battery connected to the DC-DC converter, wherein the battery-to-grid operation is operable to supply electric power from the battery to an AC outlet of the electric vehicle as the load of the line voltage.

5. The system of claim 1, wherein the one or more controllers are further configured to control the discharge of the bulk capacitor to the battery at the end of a grid-to-battery operation based on:

the battery being connected to the DC-DC converter, and no hardware-related faults in the AC-DC converter or the DC-DC converter.

6. The system of claim 1, wherein the one or more controllers are further configured to control the discharge of the bulk capacitor to the battery while a voltage of the bulk capacitor is above a threshold, when the line voltage is disconnected from the AC-DC converter.

7. The system of claim 6, wherein the threshold is 60V.

8. The system of claim 1, wherein the one or more controllers are further configured to control the discharge of the bulk capacitor to the battery based on a current threshold.

9. The system of claim 8, wherein the one or more controllers are further configured to modify the current threshold based on a change in a connection to one or more of the line voltage or the battery.

10. The system of claim 1, wherein the line voltage is a three phase line voltage.

11. The system of claim 1, wherein the DC-DC converter further includes:

a bridge rectifier connected to a secondary side of the one or more transformers, the bridge rectifier including a bridge rectifier switch.

12. The system of claim 1, wherein the one or more controllers are configured to control an operation of the bridge driver switch to control a discharge of the bulk capacitor without using a discharge resistor in the AC-DC converter or the DC-DC converter.

13. The system of claim 1, further comprising:

an electric vehicle including the battery connected to the DC-DC converter.

14. A method for controlling a system including an alternating current (AC) to direct current (DC) converter including: a bulk capacitor, and an AC to DC converter switch connectable to a line voltage; and a DC to DC converter connected to the AC to DC converter, the DC to DC converter including: one or more transformers having a secondary side connectable to a battery, and a bridge driver connected to a primary side of the one or more transformers, the bridge driver including a bridge driver switch, the method comprising:

performing, by one or more controllers, operations including:

controlling an operation of the bridge driver switch to control a discharge of the bulk capacitor to the battery at an end of a grid-to-battery operation, the grid-to-battery operation to supply electric power from the line voltage to the battery, controlling an operation of the bridge driver switch to control a discharge of the bulk capacitor to the battery in one or more of the grid-to-battery operation or a battery-to-grid operation, the battery-to-grid operation to supply electric power from the battery to a load of the line voltage, and controlling an operation of the AC to DC converter switch to control the discharge of the bulk capacitor to a load of the line voltage in the battery-to-grid operation.

15. The method of claim 14, wherein the operations further include:

controlling the discharge of the bulk capacitor to the battery at the end of a grid-to-battery operation based on:

the battery being connected to the DC to DC converter, and no hardware-related faults in the AC to DC converter or the DC to DC converter.

16. The method of claim 14, wherein the operations further include:

controlling the discharge of the bulk capacitor to the battery while a voltage of the bulk capacitor is above a peak voltage of the line voltage plus a hysteresis factor, when the line voltage is connected to the AC to DC converter, and controlling the discharge of the bulk capacitor to the battery while the voltage of the bulk capacitor is above a threshold, when the line voltage is disconnected from the AC to DC converter.

17. The method of claim 14, wherein the operations further include:

controlling the discharge of the bulk capacitor to the battery based on a current threshold, and modifying the current threshold based on a change in a connection to one or more of the line voltage or the battery.

18. A system comprising:

one or more controllers configured to:

control an operation of a bridge driver switch to control a discharge of a bulk capacitor to a battery at an end of a grid-to-battery operation, the grid-to-battery operation to supply electric power from a line voltage to the battery, control the discharge of the bulk capacitor to the battery while a voltage of the bulk capacitor is above a peak voltage of the line voltage plus a hysteresis factor, when the line voltage is connected to an AC-DC converter, and control the discharge of the bulk capacitor to the battery while the voltage of the bulk capacitor is above a threshold, when the line voltage is disconnected from the AC-DC converter.

* * * * *